United States Patent [19]

Deadmond

[11] Patent Number: 5,056,298
[45] Date of Patent: Oct. 15, 1991

[54] MACHINE FOR METERING AND LOADING GROUPS OF ARTICLES

[75] Inventor: Richard S. Deadmond, Rockford, Ill.
[73] Assignee: APV Crepaco, Inc., Rockford, Ill.
[21] Appl. No.: 641,266
[22] Filed: Jan. 15, 1991
[51] Int. Cl.$^5$ .................. B65B 5/10; B65B 35/44
[52] U.S. Cl. ......................... 53/534; 53/250; 53/543; 53/251
[58] Field of Search ............ 53/244, 251, 48.1, 534, 53/543, 250

[56] References Cited

U.S. PATENT DOCUMENTS

| | | | |
|---|---|---|---|
| 3,481,108 | 12/1969 | Englander et al. | 53/534 |
| 4,642,967 | 2/1987 | Culpepper | 53/534 X |
| 4,748,791 | 6/1988 | Langenbeck | 53/534 X |
| 4,832,178 | 5/1989 | Anderson et al. | |
| 4,905,446 | 3/1990 | Dieckbernd | |
| 4,949,531 | 8/1990 | Langenbeck et al. | 53/534 X |

Primary Examiner—John Sipos
Assistant Examiner—Linda B. Johnson
Attorney, Agent, or Firm—Vernon J. Pillote

[57] ABSTRACT

A continuous motion machine for metering and loading groups of articles onto flat pads. The machine includes endless type infeed conveyors for advancing articles in a downstream direction to a dead plate and a row metering device intermediate the ends of the upper run of the infeed conveyor for retarding advance of the articles on the infeed conveyor and for releasing the articles one row at a time. An endless type overhead conveyor has flight bars pitched therealong and an inlet run extending downwardly toward the upper end of the infeed conveyor at a location downstream of the metering device and a lower run extending in the downstream direction above the infeed conveyor and above the dead plate. A pad conveyor is disposed below the dead plate and is operated to advance pads to a pad transfer passage intermediate the ends of the dead plate. The flight bars on the overhead conveyor each include a pad pusher and mechanism for moving the pad pusher to a raised position spaced above the infeed conveyor as the flight bars advance along the lower run toward the pad transfer passage and for moving the pad pusher to a lower position as the flight bar advances away from the pad transfer passage for engaging the trailing edge of the pad to advance the pad and container group thereon.

21 Claims, 7 Drawing Sheets

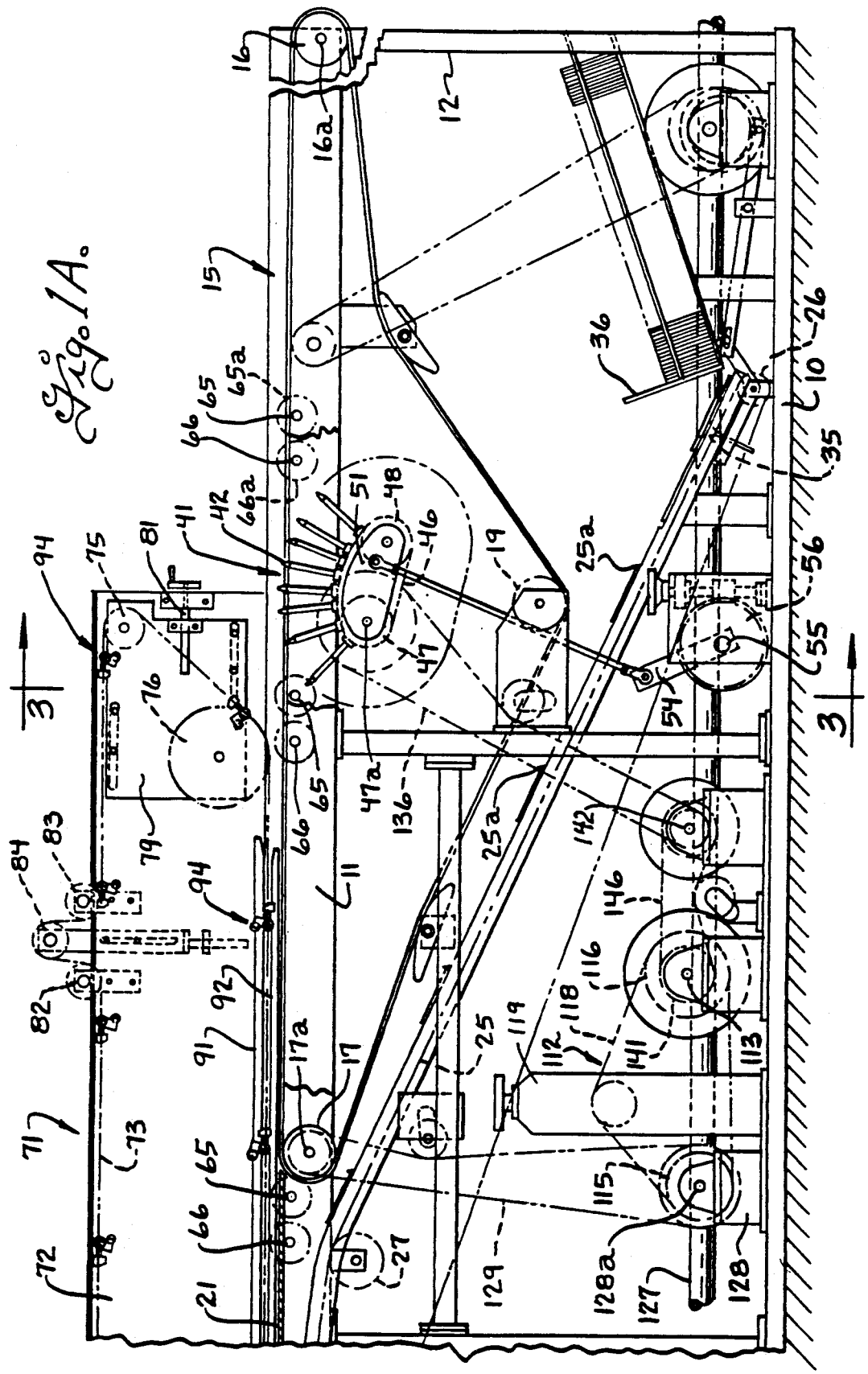

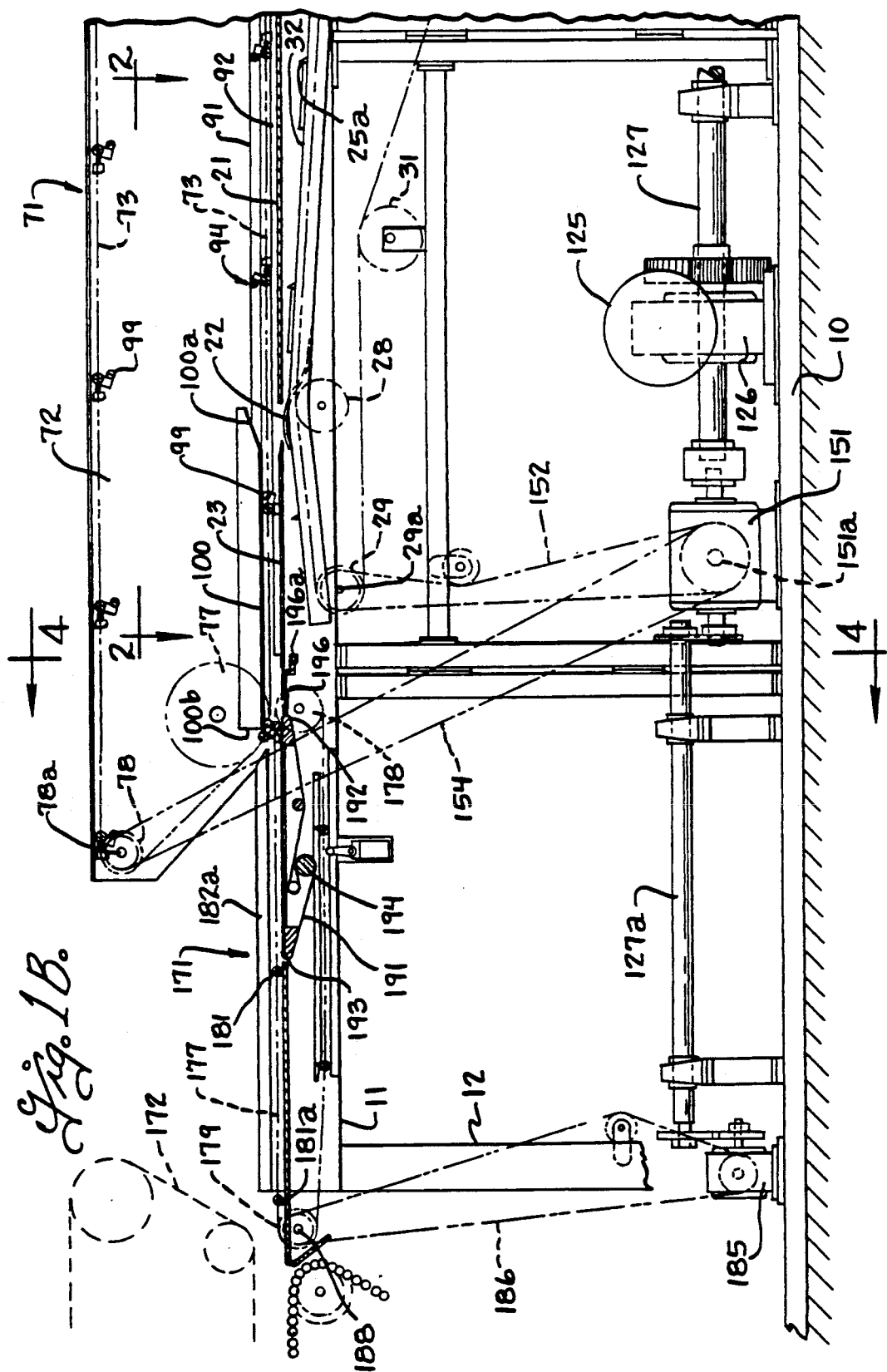

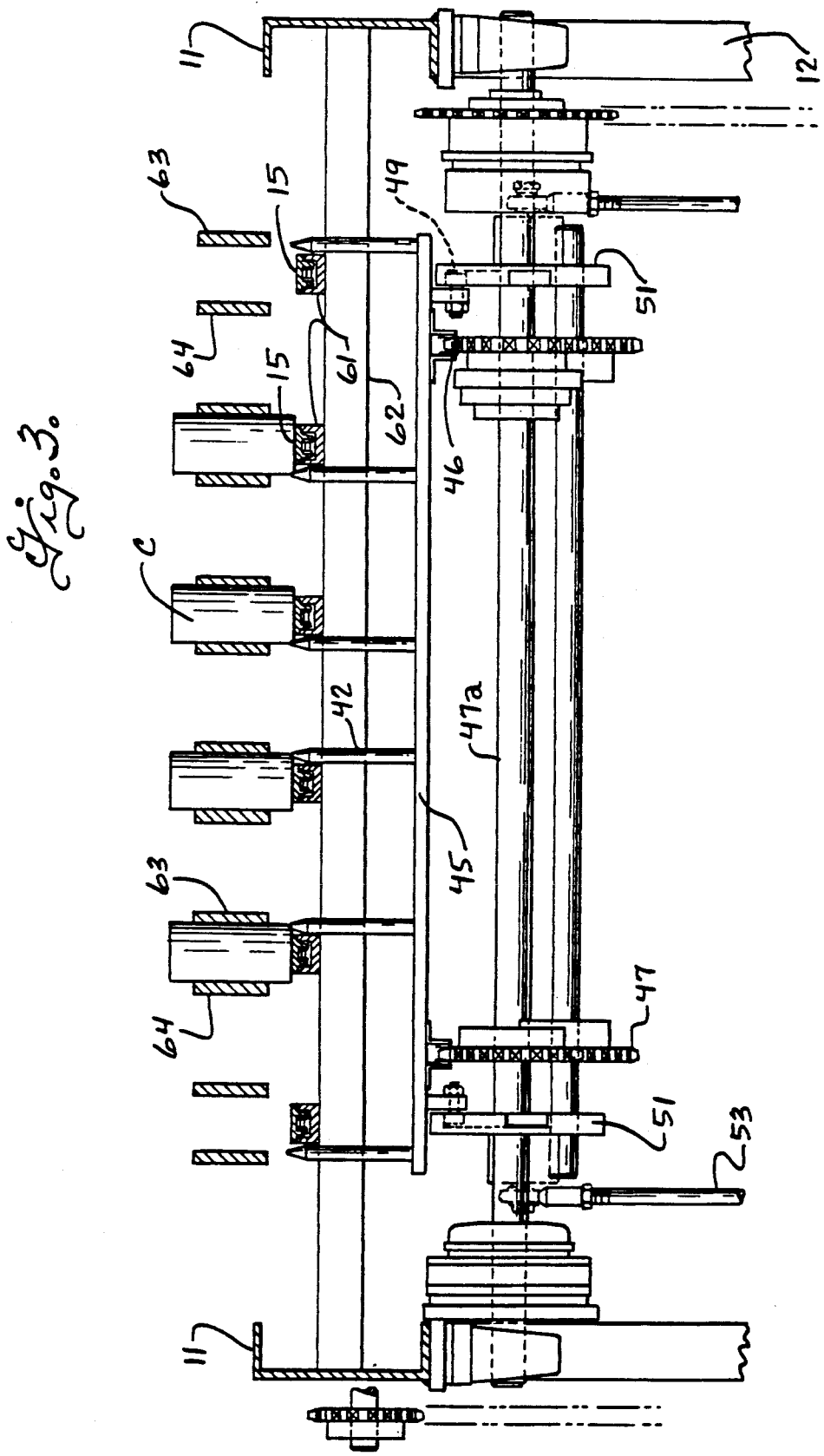

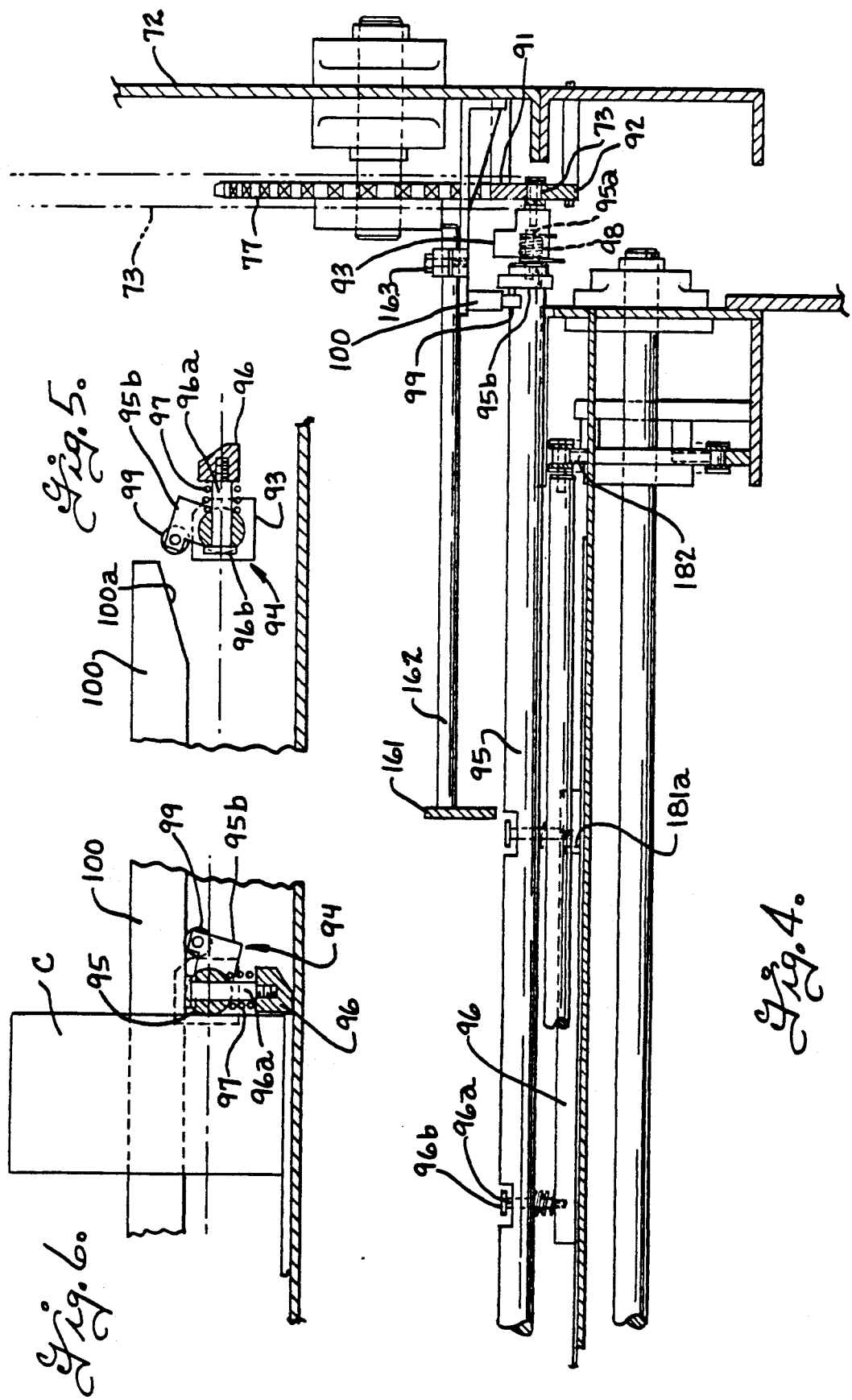

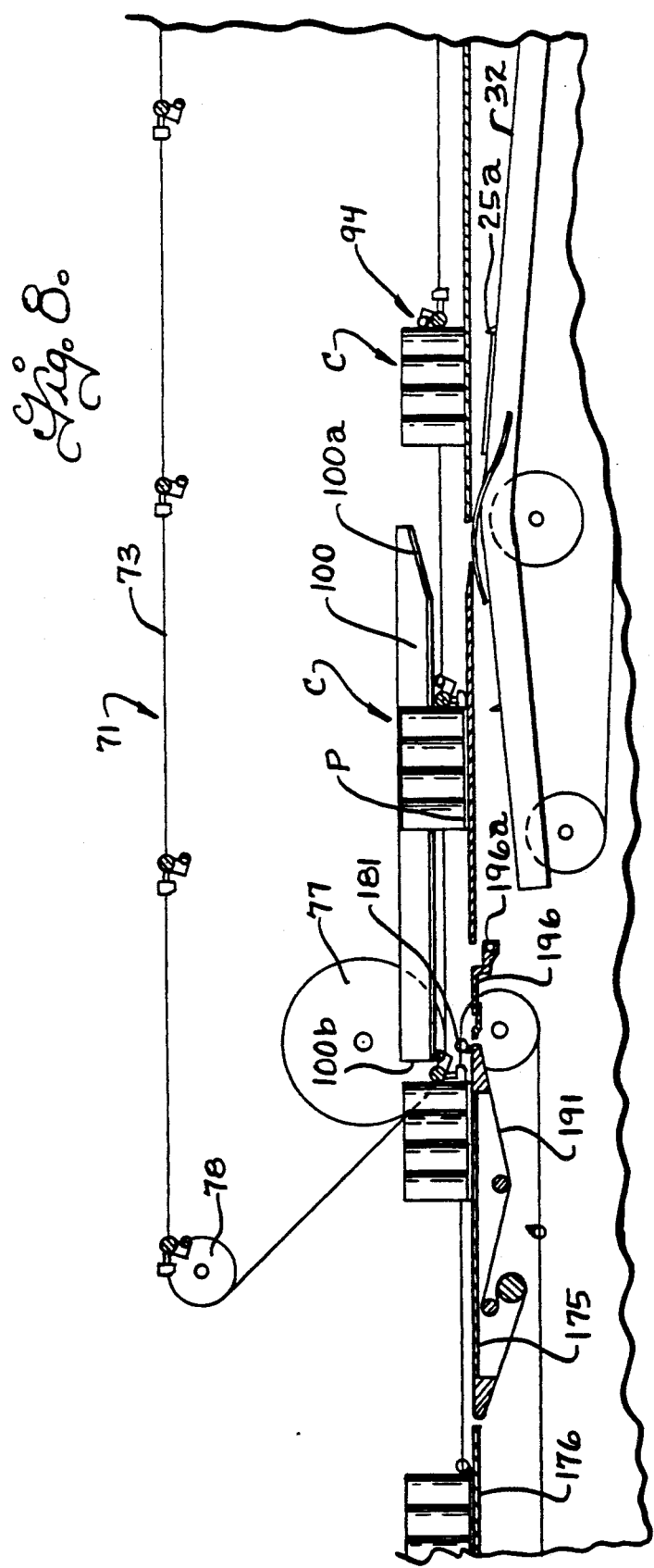

MACHINE FOR METERING AND LOADING GROUPS OF ARTICLES

BACKGROUND OF THE INVENTION

Various machines have heretofore been made for loading groups of articles such as cylindrical containers into flanged trays. The tray flanges constitute a significant portion of the material required for making the trays and savings in material and hence cost can be achieved by use of flat pads having an area generally corresponding to only that required for the bottom of the flanged trays. However, prior packaging machines for loading groups of articles into flanged trays relied on the tray flanges to locate the articles during loading of the articles on the trays and to retain the articles during transfer of the trays with the articles loaded thereon to a subsequent wrapping apparatus, and such prior tray loading machines are neither constructed or adapted for loading articles onto flat pads and transferring the pads with an article group thereon to a subsequent wrapping machine.

Prior packaging machines for loading articles into trays also required relatively complex apparatus for erecting the tray flanges and which significantly increased the overall cost of such machines.

SUMMARY OF THE INVENTION

It is the general object of the present invention to provide an apparatus for metering and loading groups of articles onto flat pads and for transferring the pads with the articles loaded thereon to a subsequent wrapping machine.

Another object of this invention is to provide a machine for loading groups of articles onto flat pads, and which can be readily adjusted to meter articles of different size and to form and load article groups of different numbers.

Accordingly, the present invention provides a continuous motion machine for metering and loading groups of articles onto flat pads and which includes a plurality of endless type infeed conveyors each having an upper run arranged to support and advance articles in sidewise adjacent lanes to an outlet end, and generally horizontal stationary support means having a first section extending downstream from the infeed conveyor to a pad transfer passage. A metering means is provided intermediate the ends of the upper run of the infeed conveyor and includes article engaging pin means movable in an endless loop and arranged to project above the upper run of the infeed conveyor means in a portion of the loop to retard advance of articles on the infeed conveyors. A pad conveyor means is disposed below the stationary article support and has pac pushers pitched therealong for advancing flat pads along a pad path inclined upwardly toward the pad transfer passage. An endless type overhead flight bar conveyor means has an inlet run extending downwardly toward the upper run of the infeed conveyors at a location downstream of the metering means and a lower run extending in the downstream direction above the infeed conveyor and above the stationary article support means to an outlet run downstream of the pad transfer passage for advancing groups of articles across the article support means and past the pad transfer passage to load articles onto a pad. The flight bars on the overhead conveyor means each include pad pusher means and means for moving the pad pusher means to a raised position spaced above the upper run of the infeed conveyor means as the associated flight bar advances along the lower run toward the pad transfer passage and for moving the pad pusher means to a lowered position as the flight bar advances away from the pad transfer passage along the second section of the support means for engaging the trailing edge of the pad to advance the pad and the article group thereon.

The article metering means is preferably arranged to retard advance of successive articles on the infeed conveyor means and to create a space between adjacent rows of articles and the article metering means is driven at a selectively changable speed correlated with the speed of the overhead conveyor to release a preselected number of rows of articles in spaced succession corresponding to a desired group of articles as the overhead conveyor advances a distance corresponding to the pitch of the flight bars. The flight bars of the overhead conveyor are arranged to move downwardly into the space between a row of articles at a trail end of a preceding group and an adjacent row of articles at the lead end of a following group and the flight bar conveyor is driven at a speed slower than the infeed conveyor, to retard advance of the row of articles at the lead side of the following group and form the spaced rows of the following group into sidewise adjacent rows as the articles are advanced along the infeed conveyor. The advance of the articles by the infeed conveyors stop when they reach the outlet end and the flight bars on the overhead conveyor are thereafter operative to engage the row of articles at the trail end of the preceding group to advance the preceding group of articles across the article support means past the pad transfer passage to load the article group onto a pad.

In accordance with another aspect of the present invention, the machine includes an outlet conveyor comprising an endless belt having an upper run extending downstream from the article support means and an endless type lower flight bar conveyor means having flight bars at a preselected pitch therealong with the upper run of the lower flight bar conveyor means extending downstream from the upper run of the overhead conveyor and above the upper run of the belt. The belt is driven to advance the pads with the article group thereon away from the overhead conveyor means and at a speed slower than the lower flight bar means so that the flight bar on the lower flight bar conveyor means can advance into engagement with the article group before the pad with the article group thereon reaches the end of the lower conveyor belt. The lower flight bar conveyor also has pad pusher fingers extending downwardly from each of the flight bars as the flight bars move along the upper run for engaging the trail edge of a pad and to continue advance of the pad with an article group thereon.

BRIEF DESCRIPTION OF THE DRAWINGS

FIGS. 1A and 1B are respectively right and left parts of a longitudinal sectional view through the machine;

FIG. 3 is a fragmentary vertical sectional view taken on the plane 3—3 of FIG. 1a and illustrating parts on a larger scale than FIG. 1a;

FIG. 4 is a fragmentary transverse sectional view taken on the plane 4—4 of FIG. 1b and illustrating parts on a larger scale;

FIG. 5 is a fragmentary sectional view through a flight bar illustrating the pad pusher in a raised position;

FIG. 6 is a fragmentary sectional view through a flight bar illustrating the pad pusher in a lowered position;

FIG. 8 is a fragmentary longitudinal sectional view of the outlet portion of the machine illustrating loading of groups of articles onto a pad and transferring the pads with the article groups loaded thereon to an outlet conveyor.

DETAILED DESCRIPTION

The present invention is particularly adapted for metering and loading articles or containers having a generally circular base on a flat pad and for transferring the pads with article groups thereon to a subsequent wrapping machine.

Figure 2:
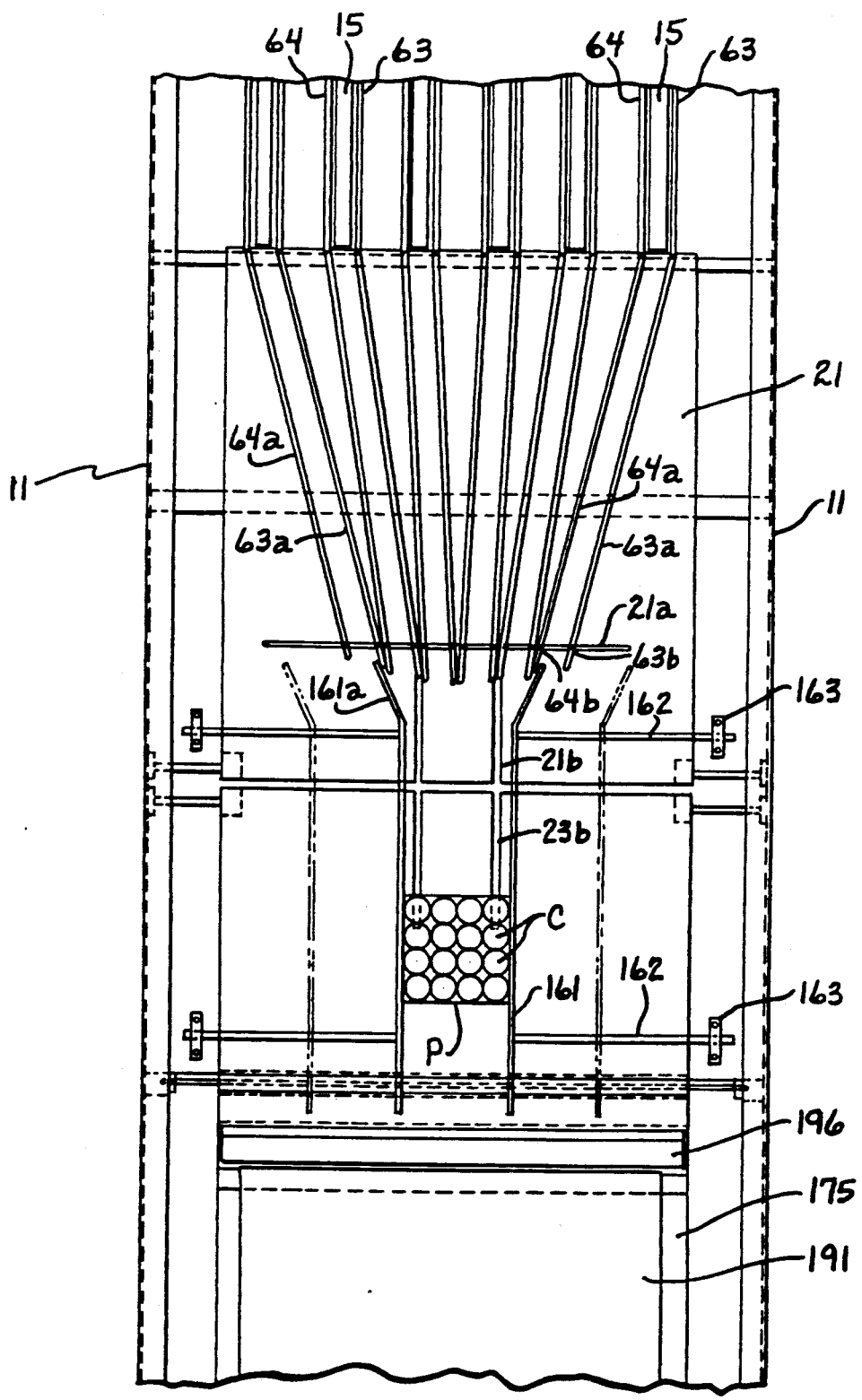
FIG. 2 is a fragmentary horizontal sectional view taken on the plane 2—2 of FIG. 1b.

Referring now more specifically to FIGS. 1A and 1B, the machine includes a frame structure including lengthwise extending base members 10 and lengthwise extending upper frame members 11 supported by uprights 12 on the base members. A plurality of endless type infeed conveyor means 15 each has a horizontal upper run extending between sprockets 16 and 17 mounted on shafts 16a and 17a rotatably supported in the upper frame members 11 and the infeed conveyors each have a lower return run guided over an adjustable tension adjusting sprocket 19. A stationary article support is mounted on the upper frame members 11 and, includes a first support section 21 that extends downstream from the outlet end of the infeed conveyor to a pad transfer passage 22, and a second support section 23 that extends downstream from the pad transfer passage. As used herein, stationary article support means refers to an article support such as a dead plate that does not advance the articles supported thereon. An endless type pad conveyor 25 is disposed below the infeed conveyors and the stationary article support sections 21, 23, and the pad conveyor has an upper run guided over sprockets 26, 27, 28 and 29 and a lower return run guided over a sprocket 31. Pad guide rails 32 extend alongside the upper run of the pad conveyor and the pad conveyor has pushers 25a pitched therealong for advancing pads along the guide rails upwardly toward the pad transfer passage 22. As best shown in FIG. 2, the article support plates 21 and 23 have slots 21b and 23b that intersect the pad transfer passage 22 to allow the pad pusher fingers 25a to project axially above the support plates as the pusher fingers advance the tract edge of the pads through the pad transfer passages. A pad feed mechanism 35, such as vacuum operated grippers, is provided for feeding pads from the end of a pad magazine 36 to the pad conveyor.

An endless type row metering means 41 is provided intermediate the ends of the upper run of the infeed conveyor means 15 and includes a plurality of article engaging pins 42 connected for movement in an endless loop and arranged to project above the upper run of the infeed conveyor means in a portion of the loop to retard advance of articles on the infeed conveyor. The row metering means is adjustable to vary the pitch between tips of the pins in the portion of the loop where they project above the infeed conveyor, to accommodate containers of different size. In the embodiment illustrated, the metering means 41 is of the type disclosed in U.S. Pat. No. 4,832,178, the disclosure of which is incorporated herein by reference. As best shown in FIGS. 1A and 3, the pins 42 are mounted in rows on transverse flight bars 45, and the flight bars are connected by chains 46 entrained over sprockets 47 and 48. Cam followers 49 on the cross bars 45, ride in cam tracks formed in cam plates 51 and the cam tracks are shaped such that the spacing between the tips of the pins 42 varies and in particular increases as the pins approach the end of the cam track adjacent sprocket 47. As disclosed more fully in the '178 patent, the cam plates 51 are pivotal about the axis 47a of the sprockets 47 to vary the effective spacing between the tips of the pins that project above the infeed conveyor and thereby adapt the metering device to containers of different diameter. Adjustment of the cam plates about the axis of the sprockets 47 is conveniently effected by links 53 connected at one end to the cam plates and at the other end to an arm 54 that is angularly adjustable about a shaft 55 by a hand adjustable worm and worm wheel drive 56.

As best shown in FIG. 3, the upper runs of the infeed conveyors 15 are laterally spaced apart in a direction crosswise of the machine and are supported in guides 61 attached to cross members 62 fixed to the upper frame members 11. The containers are laterally guided during movement along the upper runs of the respective infeed conveyor by a pair of lane guides 63 and 64 individual to each infeed conveyor and provision is made for laterally adjusting the spacing between each pair of lane guides 63 and 64 to accommodate containers of different diameter. As best shown in FIG. 1, a plurality of pairs of adjustable cross members 65, 66 are mounted at spaced locations along the upper frame members 11 and the container guides 63 at one side of the associated endless conveyors are connected to the adjustable cross member 65 at a level below the upper run of the infeed conveyor and, similarly, the other lateral container guides 64 are connected to the other adjustable cross members 66, and the cross members 65 and 66 can be adjusted in a direction crosswise of the machine in any suitable manner as by hand wheels 65a and 66a, to adjust the spacing of the lateral container guides relative to the centerline of the associated infeed conveyor.

An overhead flight bar conveyor 71 is mounted on spaced side panels 72 that extend upwardly from the upper frame members 11. The upper flight bar conveyor includes laterally spaced endless chains 73 having an inlet run that extends downwardly from a sprocket 75 and under a sprocket 76 toward the upper run of the infeed conveyors at a location downstream of the metering means 41, and a lower run that extends in the downstream direction above the infeed conveyors and above the first and second sections of the stationary support means and under a sprocket 77 to an outlet run that extends from sprocket 77 to a sprocket 78, and a return run that extends from the sprocket 78 back to the sprocket 75. For reasons pointed out more fully hereinafter, sprockets 75 and 76 are mounted on plates 79 for adjustment in a direction longitudinally of the lower run, as by a screw and screw follower arrangement 81. The effective length of the upper or return runs of the overhead flight bar conveyor are made adjustable and, as shown, pass under fixed idler sprockets 82 and 83 and over a vertically adjustable idler sprocket 84.

The chains 73 of the overhead flight bar conveyor are vertically guided along the lower run between upper and lower guide rails 91, 92 that are fixed to the panels 72 and upper frame members 11, respectively. The overhead conveyor has flight bar means 94 at a preselected pitch therealong and each flight bar means includes a bar 95 having opposite ends mounted as by axial pins 95a (FIG. 4) on carrier blocks 93 on the overhead conveyor chains 73 for turning movement about an axis lengthwise of the flight bar. The flight bar means also include a pad pusher 96 mounted on the flight bar means for turning movement therewith between a raised position as shown in FIG. 5 in which the pad pusher means is disposed at a level spaced above the upper run of the infeed conveyor and above the lane guides 63, 64, and a lowered position as shown in FIG. 6 in which the pad pusher means is disposed closely adjacent the article support means for engaging the trailing edge of a pad. As best shown in FIGS. 4, 5, and 6, each pad pusher means 96 is supported on guide rods 96a for limited shifting movement in a direction generally radially of the associated flight bar 95, and the pad pushers are yieldably urged in a direction radially outwardly of the flight bar by springs 97 until a head 96b on the guide rod engages the flight bar. The flight bars are biased angularly by means such as torsion springs 98 having one end connected to an arm on the end of the flight bar and the other end connected to an associated one of the carrier blocks 93 on chains 73, to normally urge the pad pushers 96 to a raised position at the trail side of the associated flight bar as shown in FIG. 5, as the flight bars advance along the upper run of the infeed conveyors and over the section 21 of the stationary article support. Cam followers 99 are mounted on arms 95b provided on the ends of the flight bars at a location radially offset from the axis of the flight bar and cams 100 are mounted on the side panels 72 of the overhead conveyor. The cams 100 have an inlet end 100a arranged to engage the cam followers 99 and rotate each flight bar to position the pad pusher in a lowered position closely adjacent the outlet section 23 for engaging the trailing edge of a pad, when the flight bar is adjacent the pad transfer passage 22. The cams 100 maintain the pad pushers in a lowered position as the flight bars advance along the section 23 of the article support so that the pad pushers engage and advance the pad while the flight bars advance the group of articles on the pad.

The several conveyors are driven in timed relation with each other by a drive motor 125 through a clutch brake drive 126 connected to a line shaft 127. Line shaft 127 is connected through a right angle drive 128 having an output shaft 128a that is connected through chain 129 to a sprocket on infeed conveyor drive shaft 17a for driving the infeed conveyor 15. The output shaft 128a of right angle drive 128 is also connected to a speed change drive 112 for changing the speed ratio between the shaft 127a and an output shaft 113. The speed change drive may, be a shiftable belt type speed change drive comprising two or more stepped pulleys 115 on the input shaft 128a and a complementary set of stepped pulleys 116 on the output shaft 113 and a toothed belt 118 for drivingly interconnecting the pulleys on the input and output shafts. As is conventional in such belt type speed change drives, the belt can be manually shifted to interconnect different pulleys on the input and output shafts to vary the speed ratio therebetween. As shown in FIG. 1A, a belt tensioner means 119 is provided for releasing belt tension during shifting of the belts on the stepped pulleys 115, 116 and for tightening the belt after the belt has been shifted. A sprocket 141 on the output shaft 113 is connected through a chain 146 to a sprocket on a shaft 142 and this shaft is connected through a chain 136 to the drive shaft 47a of the metering device for driving the pin type metering means 41. As shown in FIG. 1B, the line shaft 127 is also connected through a right angle drive 151 having an output shaft 151a and this shaft is connected through a chain 152 to a sprocket on pad conveyor drive shaft 29a for driving the pad conveyor, and through chain 154 to a sprocket on overhead conveyor drive shaft 78a for driving the overhead conveyor 71.

The drive means is arranged to drive the lower run of the overhead conveyor means at a preselected linear speed, for example, 16.875 inches per second and to drive the tray conveyor at the same linear speed. The drive means drives the upper runs of the infeed conveyors 15 at a linear speed in the downstream direction substantially higher than the linear speed of the overhead conveyor, for example, at a linear speed of 25 inches per second. The drive means also drives the row metering means 41 so that the portion of the loop that projects above the infeed conveyor moves in the downstream direction at a preselected speed slower than the infeed conveyor to retard advance of successive articles on the infeed conveyor and create a space between adjacent rows of articles. The speed of the metering means is correlated with the speed of the overhead conveyor means through the adjustable speed change drive 112 to release a preselected number of rows of articles in spaced succession corresponding to desired number of rows in a group of articles, as the overhead conveyor means advances a distance corresponding to the pitch of the flight bars thereon. The flight bars on the overhead conveyor means are arranged to move downwardly into the space between the row of articles at the trail end of a preceding group and an adjacent row of articles at the lead end of the following group and, since the flight bars are advanced at a speed slower than the speed of the infeed conveyor means, the flight bar means are operative to retard advance the row of articles at the lead side of the group and form the spaced rows of the following group into sidewise adjacent rows as the articles are advanced along the infeed conveyors. The flight bars must clear the top of the article at the lead side of the succeeding group as the flight bars move downwardly along the inlet run. In order to adapt the machine for handling very tall as well as very relatively short articles, the inlet run is made adjustable in a direction lengthwise of the path of advance of the article to adjust the timing between the release of articles by the metering means 41 and the movement of the flight bars 94 along the inlet run of conveyor 71 and such that each flight bar will pass over the top of the row of articles at a lead side of one group and engage the trail side of the row of articles of the preceding group as the flight bars move downwardly along the inlet run of conveyor 71.

The pushers 25a on the pad conveyor are pitched apart therealong a distance corresponding to the pitch of the flight bars on the overhead conveyor and the pad conveyor is driven at the same speed as the overhead conveyor and is timed so that the pad pushers 25a advance the trail edge of the pad through the pad transfer passage 22 at the same time that the flight bars on the overhead conveyor advance the trail side of the article group past the pad transfer passage. The lateral lane guides 63 and 64 extend to the outlet end of the infeed conveyor means in spaced parallel relation to each other as best shown in FIG. 2, and outlet lane guide members 63a and 64a are pivotally connected to the end of respective ones of the guides 63, 64 and extend above a portion of the stationary guide plate 21. The distal ends of the members 63a and 64a are adjustable by fasteners 63b, 64b that extend through an elongated slot 21a in the support plate 21, to laterally guide the spaced lanes of articles in converging relation to each other as they are advanced by the overhead conveyor across article support section 21, to form a laterally compact group of articles.

Lateral guides 161 for laterally guiding the container groups as they are advanced across outlet article support section 23, are affixed to rods 162 and mounted at 163 on upper frame members for adjustment in a direction laterally of the path of travel of the group, to accommodate article groups of different width. As shown in FIG. 2, the guides 161 have relatively diverging inlet ends 161a to receive containers from the outlet ends of guide members 63a, 64a.

An outlet conveyor means 171 is provided for advancing pads with the group of articles loaded thereon away from the outlet end of the overhead conveyor 71 to a wrapping machine diagrammatically indicated at 172 in FIG. 1B. The wrapping machine is preferably a shrink film type wrapper and may, for example, be of the type disclosed in U.S. Pat. No. 4,905,446, the disclosure of which is incorporated herein by reference. The outlet conveyor includes a first support panel 175 and a second support panel 176. A lower flight bar conveyor includes endless chains 177 entrained over inlet and outlet sprockets 178 and 179, and flight bars 181 that extend between the chains. The upper runs of the chains 177 are guided on guides 182, (see FIG. 4) to maintain the flight bars at a preselected level above the support panels 175, 176, and the flight bars each have downwardly extending pad engaging fingers 181a that extend downwardly and closely adjacent the upper surface of the support panels 175, 176 to engage the trail edge of a pad. The lower flight bar conveyor is driven in timed relation with the overhead conveyor and, as shown in FIG. 1B, an extension 127a of the line shaft 127 is connected through a right angle drive 185 and chain 186 to a sprocket on outlet conveyor drive shaft 188. The flight bars 181 are pitched along the lower flight bar conveyor a distance corresponding to the pitch of the flight bar 94 on the overhead flight bar conveyor and the lower flight bar conveyor is driven at the same speed as the overhead conveyor to advance the upper run in the forward direction.

Figure 7:
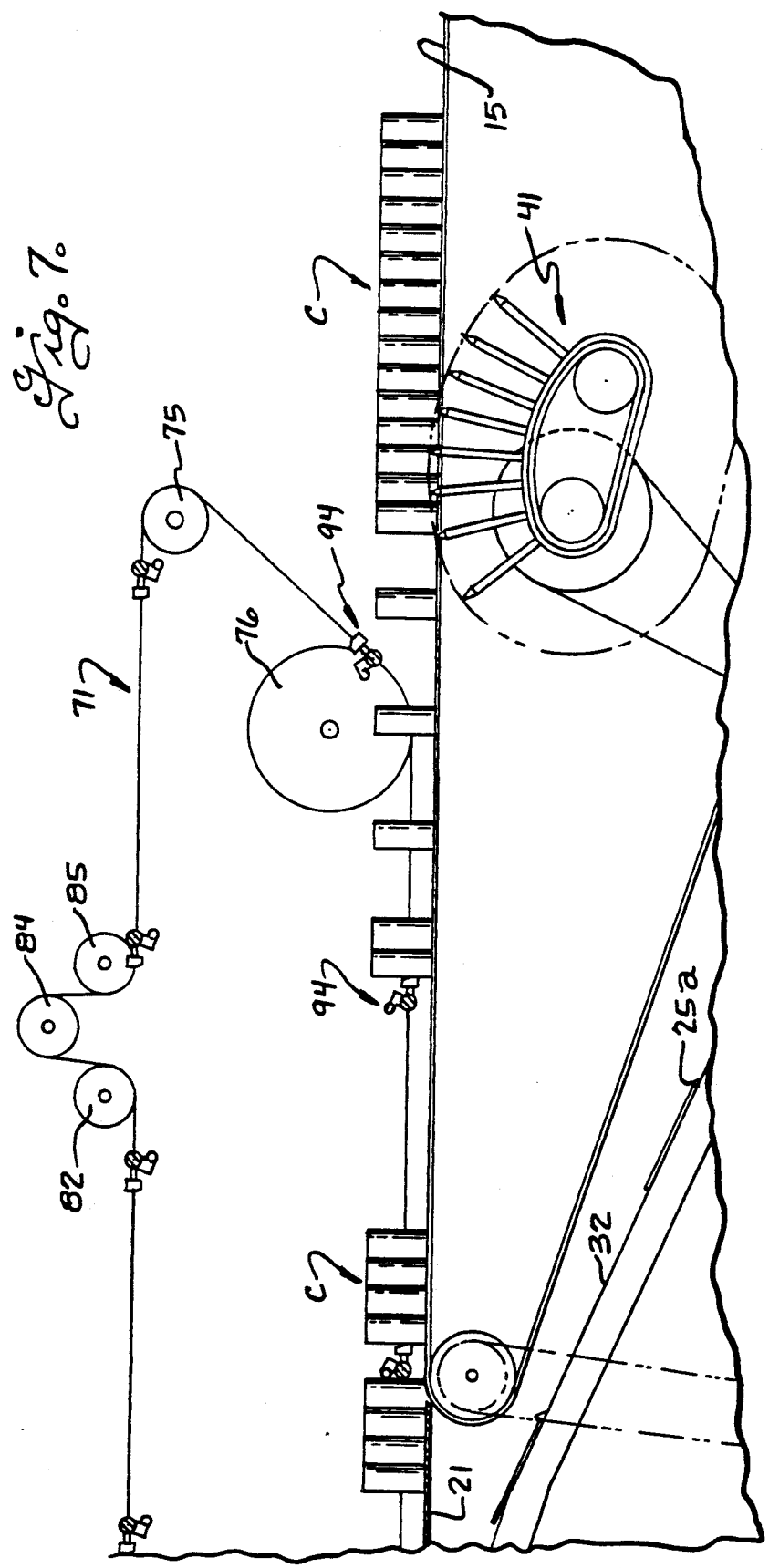
FIG. 7 is a fragmentary longitudinal sectional view of the inlet portion of the machine illustrating metering of the rows of articles.

In order to prevent interference between the flight bars 181 on the lower conveyor 171 and the flight bars 94 on the overhead conveyor, the lower flight bar conveyor is timed so that the flight bars 181 lag behind the flight bars 94 on the overhead conveyor, as the flight bars on the lower conveyor move upwardly to the inlet end of the upper run. As shown in FIGS. 1B and 7, the outlet end 100b of the cam 100 is disposed adjacent the inlet end of the upper run of the outlet conveyor such that the cam followers 99 disengage from the cam 100 and allow the pad pushers 96 to swing upwardly and rearwardly to a raised position shown in phantom in FIG. 5. Since the flight bars on the lower conveyor lag behind the flight bars on the upper conveyor, the pushers 181a on the outlet conveyor are not in a position to commence pushing on the trailing edge of the pad at the time the pad pushers 96 on the overhead conveyor are moved to their raised or retracted position. In order to continue advance of the pads with the containers thereon, an endless belt conveyor 191 is provided with an upper run that overlies the support panel 175 and extends between inlet and outlet guides 192 and 193, and a lower run that is wrapped part way around a drive roller 194. The belt drive roller 194 is driven, as from a power take off (not shown) from shaft 188 to advance the upper run of the belt in the forward direction and thereby continue to advance the pad with the articles thereon away from the overhead conveyor. The belt 191 is preferably driven at a linear speed slightly slower than the linear speed of the outlet flight bar conveyor so that the flight bars 181 on the outlet conveyor catch up to the pad and articles on the belt before the pad and articles reach the outlet end of the belt. This arrangement provides a smooth transfer of advance of the pad and article group thereon from the overhead conveyor to the outlet conveyor 171. As is apparent, an opening must be provided between the section 23 of article support and the outlet support panel 175, to allow the lower flight bars to pass upwardly therethrough. A small support panel 196 is hinged adjacent its inlet end at 196a for vertically swinging movement, to allow the lower flight bars 181 to pass upwardly therepast and then drop down to the level of the support section 175, to support a succeeding pad and the article group thereon.

From the foregoing it is believed that the construction and operation of the machine for metering and loading articles or containers onto flat pads will be readily understood. As shown in FIGS. 7 and 8, containers C are supplied to the inlet end of the machine and are advanced by the endless type infeed conveyors 15 in lanes and in sidewise abutting relation to the row metering device 41, as shown at the right side of FIG. 7. The pin type row metering means is driven at a speed slower than the inlet conveyor to retard advance of the containers along the infeed conveyor and the row metering device is timed with relation to the overhead conveyor 71 to release a preselected number of rows of containers, for example, one, two, three or four rows, as the overhead conveyor is advanced a distance corresponding to the spacing between the flight bars. Since the infeed conveyors continue to advance each row of containers after it is released by a metering device, the metering device creates a space between adjacent rows of containers as they are advanced along the infeed conveyor to the inlet end of the overhead conveyor. The flight bars 94 on the overhead conveyor move downwardly into the space between a row of containers at a trail end of the preceding group and an adjacent row of containers at a lead end of a following group. The overhead conveyor is driven at a linear speed slower than the infeed conveyor 15 and the flight bars on the overhead conveyor are operative to retard advance of the row of articles at the lead side of the following group and reform the spaced of rows of the following group to sidewise adjacent rows as the articles are advanced along the infeed conveyor. When the group of articles reach the outlet end of the infeed conveyor, advance of the group by the infeed conveyors stops. Each flight bar is thereafter operative to engage the row of articles at the trail end of a preceding group to advance the preceding group of articles across the article support 21 and past the pad transfer passage 22. The pushers 25a on the pad conveyor advance a pad to the pad transfer passage while the flight bar on the overhead conveyor advances the group of articles past the pad passage so that each group of articles is loaded onto a pad P. As the flight bars on the overhead conveyor move to a position downstream of the land guides and adjacent the pad transfer passage, the lead end 100a of cam 100 engages cam follower 99 on the flight bar and operates the flight bars to swing the pad pushers downwardly to engage the trail edge of a pad to advance the pad with the article group thereon along the article support section 23. The flight bars on the overhead conveyor continue to advance the pads and the article group thereon until the flight bars reach the outlet end of the overhead conveyor. At that time, the cam followers ride past the outlet end 100b of the cam 100 and the pad pushers swing upwardly to their raised or retracted position. The belt conveyor 191 continues to advance the pad and the article group thereon until a flight bar 181 on the outlet conveyor catches up to the pad and containers on the belt conveyor. The lower flight bar conveyor then continues advance of the pad and the articles thereon to the wrapping machine 172.

The embodiments of the invention in which an exclusive property or privilege is claimed are defined as follows:

1. A continuous motion machine for metering and loading groups of articles onto flat pads comprising:
    (a) A plurality of endless type infeed conveyor means each having a generally horizontal upper run arranged to support and advance articles in a downstream direction in sidewise adjacent lanes to an outlet end of the infeed conveyor means,
    (b) generally horizontal stationary support means having a first section extending downstream from the infeed conveyor means to a pad transfer passage and a second section extending downstream from the pad transfer passage,
    (c) endless type metering means intermediate the ends of the upper run of the infeed conveyor means and including article engaging pin means movable in an endless loop and arranged to project above the upper run of the infeed conveyor means in a portion of the loop to retard advance of articles on the infeed conveyor means,
    (d) endless type overhead conveyor means having article engaging flight bar means at a preselected pitch therealong, the overhead conveyor means having an inlet run extending downwardly toward the upper run of the infeed conveyor means at a location downstream of the metering means and a lower run extending in the downstream direction above the infeed conveyor means and above the first and second sections of the support means to an outlet run downstream of the pad transfer passage,
    (e) endless type pad conveyor means below the support means having pad pushers pitched therealong corresponding to the pitch of the flight bars on the overhead conveyor means for advancing flat pads along a pad path and through the pad transfer passage,
    (f) drive means for driving said overhead conveyor means and said pad conveyor means and said metering means in timed relation,
    (g) a pair of lane guide means individual to each infeed conveyor means having inlet ends upstream of the metering means and outlet ends downstream of the outlet ends of the infeed conveyor means,
    (h) the flight bar means each including a pad pusher means, means for moving the pad pusher means on each flight bar means to a raised position above the lane guide means as the flight bar means advances along the lower run toward the outlet ends of the lane guide means, and means for moving the pad pusher on each flight bar means to a lowered position closely adjacent the stationary support means after the flight bar means advances past outlet ends of the lane guide means and for maintaining the pad pusher means in the lowered position as the flight bar means advances above the second section of the stationary support means to engage the trailing edge of a pad advanced through the pad transfer passage and advance the pad across the second section of the stationary support means.

2. The combination of claim 1 wherein the flight bar means are each mounted on the overhead conveyor means for turning movement about a horizontal axis, the pad pusher means being mounted on the flight bar means for turning movement therewith, means for turning the flight bar means to position the pad pusher means in the raised position spaced above the lane guide means as the associated flight bar means advances along the lower run toward the pad transfer passage and for turning each flight bar means to position the pad pusher means in a lowered position closely adjacent the support means for engaging the trailing edge of a pad when the flight bar means is adjacent the pad transfer.

3. The combination of claim 1 including outlet conveyor means comprising an endless belt having an upper run extending downstream from the support means, and means for driving said endless belt to advance the upper run in the downstream direction.

4. The combination of claim 1 including outlet conveyor means comprising a) an endless belt having an upper run extending downstream from the support means and b) an endless type lower flight bar conveyor means having flight bars at a preselected pitch therealong, the lower flight bar conveyor means having an upper run extending downstream from the outlet run of the overhead conveyor means and above the upper run of said belt, and means for driving said lower flight bar conveyor means in timed relation with said overhead flight bar conveyor means.

5. The combination of claim 4 including means for driving the endless belt to advance the upper run at a speed slower than the lower flight bar means.

6. The combination of claim 5 including pad pusher fingers extending downwardly from each of the flight bars of the lower flight bar conveyor means as the flight bars move along the upper run for engaging a trail edge of a pad.

7. The combination of claim 1 wherein the metering means includes means for varying the spacing of the pin means in said portion of the loop to adapt the metering means to containers of different size.

8. The combination of claim 7 including means for changing the speed of the metering means relative to the speed of the overhead conveyor means to vary the number of rows of articles released by the metering means as the overhead conveyor means advances a distance equal to the pitch of the flight bars.

9. The combination of claim 1 wherein each pair of lane guide means are adjustable laterally relative to the associated infeed conveyor means to vary the spacing therebetween and thereby accommodate articles of different size.

10. The combination of claim 9 wherein each pair of line guide means includes a pair of first portions generally parallel to an associated infeed conveyor means and a pair of second portions extending from the downstream ends of the first positions, and means for adjusting the downstream ends of the pairs of second portions.

11. A continuous motion machine for metering and loading groups of articles onto flat pads comprising:
(a) a plurality of endless type infeed conveyor means each having a generally horizontal upper run arranged to support and advance articles in a downstream direction in sidewise adjacent lanes to an outlet end of the infeed conveyor means,
(b) generally horizontal stationary support means having a first section extending downstream from the infeed conveyor means to a pad transfer passage and a second section extending downstream from the pad transfer passage,
(c) endless type metering means intermediate the ends of the upper run of the infeed conveyor means and including article engaging pin means movable in an endless loop and arranged to project above the upper run of the infeed conveyor means in a portion of the loop to retard advance of articles on the infeed conveyor means,
(d) endless type overhead conveyor means having article engaging flight bar means at a preselected pitch therealong, the overhead conveyor means having an inlet run extending downwardly toward the upper run of the infeed conveyor means at a location downstream of the metering means and a lower run extending in the downstream direction above the infeed conveyor means and above the first and second sections of the support means to an outlet run downstream of the pad transfer passage,
(e) endless type pad conveyor means below the support means having pad pushers pitched therealong corresponding to the pitch of the flight bars on the overhead conveyor means for advancing flat pads along a pad path and through the pad transfer passage,
(f) a pair of lane guide means individual to each infeed conveyor means having inlet ends upstream of the metering means and outlet ends downstream of the outlet ends of the infeed conveyor means,
(g) drive means for:
 (i) driving the lower run of overhead conveyor means at a preselected linear speed in the downstream direction;
 (ii) driving the upper runs of the infeed conveyor means at a linear speed in the downstream direction substantially higher than the linear speed of the overhead conveyor means;
 (iii) driving the pad conveyor means in timed relation with the overhead conveyor means to advance pads through the pad transfer passage, and
 (iv) driving the row metering means so that said portion of the loop moves in the downstream direction at a preselected speed slower than the infeed conveyor means to retard advance of successive articles on the infeed conveyor means and create a space between adjacent rows of articles,
(h) the preselected speed of the metering means being correlated with the speed of the overhead conveyor means to release a preselected number of rows of articles in spaced succession corresponding to a desired group of articles as the overhead conveyor means advances a distance corresponding to the pitch of the flight bar means, the flight bar means on the overhead conveyor means being arranged to move downwardly into the space between a row of articles at a trail end of a preceding group and an adjacent row of articles at a lead end of a following group, the flight bar means being operative to retard advance of the row of articles at the lead side of the following group and form the spaced rows of the following group into sidewise adjacent rows as the articles are advanced along the infeed conveyor means, the flight bar means being operative to engage the row of articles at the trail end of a preceding group to advance the preceding group of articles across said support means and past said pad transfer passage to load the articles onto a pad,
 (i) the flight bar means each including pad pusher means for advancing the pad with the group of articles thereon across said second section of the article support means, means for moving the pad pusher means for each flight bar means to a raised position above the lane guide means as the flight bar means advances along the lower run toward the outlet ends of the lane guide means, and means for moving the pad pusher means on each flight bar means to a lowered position closely adjacent the stationary support means after the flight bar means advances past the outlet ends of the lane guide means and for maintaining the pad pusher means in the lowered position as the flight bar means advances above the second section of the stationary support means to engage the trailing edge of a pad advanced through the pad transfer passage and advance the pad across the second section of the stationary support means.

12. The combination of claim 11 wherein the flight bar means are each mounted on the overhead conveyor means for turning movement about a horizontal axis, the pad pusher means being mounted on the flight bar means for turning movement therewith, means for turning the flight bar means to position the pad pusher means in the raised position spaced above the upper run of the infeed conveyor means as the associated flight bar means advances along the lower run toward the pad transfer passage and for turning each flight bar means to position the pad pusher means in a lowered position closely adjacent the support means for engaging the trailing edge of a pad when the flight bar means is adjacent the pad transfer passage.

13. The combination of claim 11 including means for adjusting the downstream position of the inlet run of the overhead conveyor means relative to said metering means.

14. The combination of claim 11 wherein the metering means includes means for varying the spacing of the pin means in said portion of the loop to adapt the metering means to containers of different size.

15. The combination of claim 14 including means for changing the speed of the metering means relative to the speed of the overhead conveyor means to vary the number of rows of articles released by the metering means as the overhead conveyor means advances a distance equal to the pitch of the flight bars.

16. The combination of claim 11 including outlet conveyor means comprising an endless belt having an upper run extending downstream from the support means, and means for driving said endless belt to advance the upper run in the downstream direction.

17. The combination of claim 11 including outlet conveyor means comprising a) an endless belt having an upper run extending downstream from the support means and b) an endless type lower flight bar conveyor means having flight bars at a preselected pitch therealong, the lower flight bar conveyor means having an upper run extending downstream from the outlet run of the overhead conveyor means and above the upper run of said belt, and means for driving said lower flight bar conveyor means in timed relation with said overhead conveyor means.

18. The combination of claim 17 including means for driving the endless belt to advance the upper run at a speed slower than the lower flight bar means.

19. The combination of claim 18 including pad pusher fingers extending downwardly from each of the flight bars of the lower flight bar conveyor means as the flight bars move along the upper run for engaging a trail edge of a pad.

20. The combination of claim 11 wherein each pair of lane guide means are adjustable laterally relative to the associated infeed conveyor means to vary the spacing therebetween and thereby accommodate articles of different size.

21. The combination of claim 20 wherein each pair of lane guide means include a pair of first portions generally paralleling an associated infeed conveyor means and a pair of second portions extending from the downstream ends of the first portions, and means for adjusting the downstream ends of the pairs of second portions.

* * * * *